United States Patent
Koul et al.

(10) Patent No.: US 11,425,821 B2
(45) Date of Patent: Aug. 23, 2022

(54) OPTIMIZING DESIGN AND PERFORMANCE FOR PRINTED CIRCUIT BOARDS

(71) Applicant: Cisco Technology, Inc., San Jose, CA (US)

(72) Inventors: Amendra Koul, San Francisco, CA (US); Mike Sapozhnikov, San Jose, CA (US); David Nozadze, San Jose, CA (US); Joel Goergen, Soulsbyville, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 553 days.

(21) Appl. No.: 16/547,639

(22) Filed: Aug. 22, 2019

(65) Prior Publication Data

US 2021/0059055 A1   Feb. 25, 2021

(51) Int. Cl.
| | |
|---|---|
| H05K 3/00 | (2006.01) |
| H05K 1/18 | (2006.01) |
| H05K 1/02 | (2006.01) |
| G06F 30/367 | (2020.01) |

(Continued)

(52) U.S. Cl.
CPC ....... H05K 3/0005 (2013.01); G01R 31/2817 (2013.01); G06F 30/367 (2020.01); G06F 30/392 (2020.01); H05K 1/0237 (2013.01); H05K 1/0268 (2013.01); H05K 1/182 (2013.01); *H05K 2201/10151* (2013.01)

(58) Field of Classification Search
CPC ... H05K 3/0005; G06F 30/392; G06F 30/367; G01R 31/2817

USPC .......................................................... 703/14
See application file for complete search history.

(56) References Cited

U.S. PATENT DOCUMENTS

| | | | |
|---|---|---|---|
| 6,710,266 B2 | 3/2004 | Mix et al. | |
| 7,368,312 B1 * | 5/2008 | Kranz | ................ B81C 1/00246 |
| | | | 438/48 |
| 7,820,960 B2 | 10/2010 | Traxler | |

(Continued)

OTHER PUBLICATIONS

Miller, Jason R. et al., "Temperature and Moisture Dependence of PCB and Package Traces and the Impact on Signal Performance", http://www.electrical-integrity.com/Paper_download_files/DC12_8-WA4_slides.pdf, Feb. 1, 2012, 46 pages.

(Continued)

*Primary Examiner* — Suchin Parihar
(74) *Attorney, Agent, or Firm* — Edell, Shapiro & Finnan, LLC

(57) ABSTRACT

A printed circuit board (PCB) includes a plurality of layers disposed at different depths of the PCB, circuit components disposed at different layers of the PCB, and a plurality of temperature measurement sensors located at one or more layers of the PCB, where each temperature measurement sensor is associated with a corresponding circuit component. A measured temperature is obtained at an embedded temperature measurement sensor located at an embedded layer within the PCB, and the measured temperature is correlated with an electrical property of an embedded circuit component located at the same embedded layer within the PCB as the embedded temperature measurement sensor. A plurality of moisture measurement sensors can also be located at one or more layers of the PCB to facilitate a measured moisture with an electrical property of an embedded circuit component.

20 Claims, 9 Drawing Sheets

(51) Int. Cl.
*G06F 30/392* (2020.01)
*G01R 31/28* (2006.01)

(56) References Cited

U.S. PATENT DOCUMENTS

| | | | | |
|---|---|---|---|---|
| 9,338,040 | B2 | 5/2016 | Longo et al. | |
| 10,048,312 | B1* | 8/2018 | Hoffmeyer | G01R 31/2817 |
| 11,127,643 | B1* | 9/2021 | Heyfitch | H01L 23/49816 |
| 2006/0099328 | A1* | 5/2006 | Waite | C04B 35/632 |
| | | | | 427/372.2 |
| 2009/0308155 | A1* | 12/2009 | Zhang | G01N 27/223 |
| | | | | 73/335.02 |
| 2013/0008703 | A1* | 1/2013 | Stahr | H05K 3/4697 |
| | | | | 29/830 |
| 2018/0046747 | A1 | 2/2018 | De et al. | |
| 2018/0136266 | A1* | 5/2018 | Ho | G01J 5/046 |
| 2019/0257780 | A1* | 8/2019 | Le Neel | H01L 25/50 |
| 2019/0391103 | A1* | 12/2019 | Durupt | G01N 27/227 |
| 2020/0088590 | A1* | 3/2020 | Niemann | H05K 1/0204 |
| 2021/0018458 | A1* | 1/2021 | Vidal-Dho | G01N 27/048 |
| 2021/0055166 | A1* | 2/2021 | Wang | G01K 7/24 |
| 2021/0156904 | A1* | 5/2021 | Lim | G01R 31/2815 |
| 2021/0247218 | A1* | 8/2021 | Olsen | G01D 11/245 |
| 2021/0278385 | A1* | 9/2021 | Saraf | G01N 27/223 |
| 2021/0325445 | A1* | 10/2021 | Escher-Poeppel | |
| | | | | G01R 31/2884 |
| 2022/0091181 | A1* | 3/2022 | Song | G01R 31/2818 |

OTHER PUBLICATIONS

EETech Media, LLC., "Temperature Coefficient of Resistance", Chapter 12—Physics of Conductors and Insulators, https://www.allaboutcircuits.com/textbook/direct-current/chpt-12/temperature-coefficient-resistance/, downloaded Aug. 21, 2019, 8 pages.

Hinaga, Scoot, "Thermal Effects on PCB Laminate Material Dielectric Constant and Dissipation Factor", https://pdfs.semanticscholar.org/8d32/d1e04f6415fc6f0334bee93e2d160fa6a150.pdf, IPC APEX Expo, Apr. 6-8, 2010, 9 pages.

AgriChem, Inc., "Grain Moisture Measurement with Capacitance Type Devices", https://www.agricheminc.com/downloads/Feedgrain-297.pdf, Oct. 21, 1994, 4 pages.

Stoll, Michael, "How does a capacitive moisture measurement work?", https://www.acoweb.de/en/how-does-a-capacitive-moisture-sensor-work/amp, Jun. 30, 2017, 4 pages.

Guo, Xinyao, "Design methodology for behavioral surface roughness modeling and high-speed test board design", http://scholarsmine.mst.edu/masters_theses/7599?utm_source=scholarsmine.mst.edu%2Fmasters_theses%2F7599&utm_medium=PDF&utm_campaign=PDFCoverPages, Mar. 7, 2017, 69 pages.

Hinaga, Scott, "Effect of Conductor Surface Roughness upon Measured Loss and Extracted Values of PCB Laminate Material Dissipation Factor", http://citeseerx.ist.psu.edu/viewdoc/download?doi=10.1.1.488.9435&rep=rep1&type=pdf, downloaded Aug. 21, 2019, 14 pages.

* cited by examiner

OPTIMIZING DESIGN AND PERFORMANCE FOR PRINTED CIRCUIT BOARDS

TECHNICAL FIELD

The present disclosure relates to optimizing design and performance of printed circuit boards.

BACKGROUND

High speed channels in printed circuit boards (PCBs) are loss budgeted based on loss per inch measured at room temperature. Such losses are based, at least in part, on temperature and/or moisture fluctuations that occur along and within layers of the PCB. In accounting for such losses, typically a worst case temperature estimate on the surface of the PCB during operation is utilized to conservatively budget for potential insertion losses along the lengths of traces. However, this conservative estimate for channel loss budgeting in order to determine increase in loss can differ from actual temperatures that may occur at different layers within the PCB. Such inaccuracies can significantly reduce the budget margin that is determined, e.g., for considering choice of materials, re-timers, channel lengths and other design configurations for the PCB. This can become very important when considering certain design configurations for channels along or within a PCB that are associated with SerDes (Serializer/Deserializer) structures for the PCB. With ever increasing SerDes speeds (e.g., from 56 Gbps to 224 Gbps, etc.), accurate channel loss budgeting is critical for estimating the optimal (e.g., maximum) channel lengths for SerDes IP design. However, real time thermal and moisture data (which affect insertion losses and thus SerDes performance) at various depths or layers within a PCB is not readily available. It is desirable to accurately measure inner temperature as well as inner moisture profiles within (i.e., at different layers of) a PCB so as to ensure more accurate determinations for high speed trace loss budgeting of circuit structures of the PCB.

DESCRIPTION OF EXAMPLE EMBODIMENTS

Overview

Figure 1:
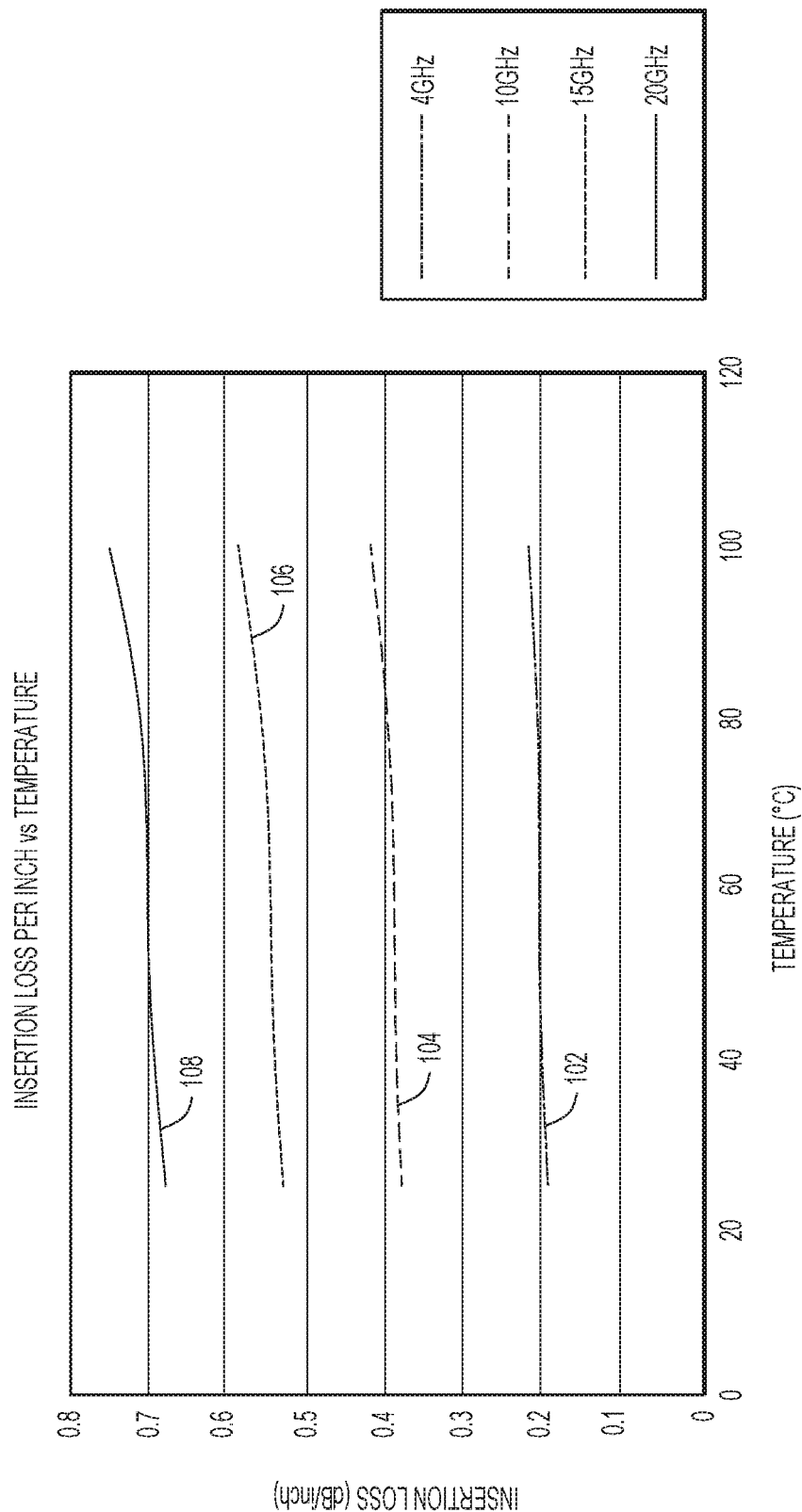
FIG. 1 is a plot showing insertion loss vs. temperature at varying signal frequencies for a PCB design, according to an example embodiment.

In example embodiments, a method comprises providing a printed circuit board (PCB) comprising a plurality of layers disposed at different depths of the PCB, circuit components disposed at different layers of the PCB, and a plurality of temperature measurement sensors located at one or more layers of the PCB, each temperature measurement sensor being associated with a corresponding circuit component. A measured temperature is obtained at an embedded temperature measurement sensor located at an embedded layer within the PCB. The measured temperature is correlated with an electrical property of an embedded circuit component located at the same embedded layer within the PCB as the embedded temperature measurement sensor. The embedded circuit component can comprise, e.g., a transmission line trace, and the electrical property can comprise an insertion loss for the transmission line trace.

In other example embodiments, one or more computer readable storage media are encoded with software comprising computer executable instructions, and when the software is executed the instructions are operable to obtain a measurement of a temperature at an embedded temperature measurement sensor located at an embedded layer within a printed circuit board (PCB), where the PCB comprises a plurality of layers disposed at different depths of the PCB, circuit components disposed at different layers of the PCB, and a plurality of temperature measurement sensors located at one or more layers of the PCB, each temperature measurement sensor being associated with a corresponding circuit component. The instructions are operable to correlate the measured temperature with an electrical property of an embedded circuit component located at the same embedded layer within the PCB as the temperature measurement sensor.

In further example embodiments, a printed circuit board (PCB) comprises a plurality of layers disposed at different depths of the PCB, a plurality of circuit components disposed at different layers of the PCB, and a plurality of temperature measurement sensors located at one or more layers of the PCB. Each temperature measurement sensor is associated with a corresponding circuit component so as to measure a temperature for the corresponding circuit component during operation of the PCB, where at least one temperature measurement sensor and the corresponding circuit component are located at an embedded layer within the PCB.

EXAMPLE EMBODIMENTS

Embodiments described herein provide methods and apparatuses that optimize performance of certain circuit components (also referred to herein as components or PCB components) of a printed circuit board (PCB), such as channel link performance in a PCB, based upon actual temperature and/or moisture measurements within and along layers of the PCB that are correlated with electrical properties of the components (e.g., insertion losses along traces) provided at such layers. The PCBs can be incorporated into a variety of different types of computing and/or other types of electronic devices.

The PCBs can include a variety of different circuit components (e.g., integrated circuit components and other electrical circuit components) formed on or within layers of the PCB including, without limitation, ASIC (application specific integrated circuit) structures, FPGA (field programmable gate array) structures, memory structures, Serializer-Deserializer (SerDes) structures, channel links/conductive traces, etc. which are mounted on (e.g., surface mounted) and/or also formed/defined (e.g., formed along and/or within layers) within the PCB. Different PCB designs may include different arrangements, types, and placement locations of components as well as selection of component materials on or within the PCB for certain applications. During operations, heat can be generated on and within the PCB causing variations in temperatures of certain PCB components along and at varying depths within the PCB. Fluctuations in moisture at varying locations along the surface as well as within layers of the PCB can also occur. As noted herein, such fluctuations of temperature and moisture at different locations along and/or within the PCB can change the electrical properties (e.g., dielectric constant (Dk) and dielectric dissipation factor (Df)) of the components and metal (e.g., copper) conductivity/resistivity, which can impact overall PCB performance. Additionally, the electrical properties of certain components can also vary based upon changes in frequency of electric signals being carried along traces of the PCB.

It has become increasingly important to accurately determine how electrical properties and, in particular, insertion losses along conductive transmission line traces (e.g., copper traces), change due to temperature and/or moisture fluctuations during PCB operations in order to optimize both design and overall performance of the PCB. An insertion loss associated with a conductive transmission line trace describes the loss of signal strength as the signal propagates along the length of the trace, where the insertion loss is defined as a ratio of output signal to input signal and is measured in decibels (dB). In particular, with the ever increasing speeds of SerDes structures for a PCB (e.g., signal speeds increasing from 56 Gbps to 224 Gbps and greater), channel budgeting (e.g., establishing suitable channel lengths) associated with conductive traces for a SerDes structure is essential to ensure minimal insertion losses and suitable performance of the SerDes structure as well as other components integrated with the PCB. Insertion losses for transmission line traces are difficult to determine in a real PCB during use are hard to determine. Typically, when designing a PCB and budgeting channel lengths of traces, a test coupon or other model test structure is utilized to predict or estimate what the insertion losses would be under certain conditions and based upon the particular PCB design.

As shown in FIG. 1, insertion losses along traces in a PCB increase both with increasing temperatures as well as increasing frequencies of operation (where plots 102, 104, 106, 108 are associated with respective signal frequencies of 4 GHz, 10 GHz, 15 GHz and 20 GHz). When traces for a SerDes structure are laid out for a PCB design, it is important to know whether parts of traces may or may not be near one or more operational hotspots on an exterior surface of and/or at different layers within the PCB in order to determine what the operational temperature range (and insertion losses) might be for such traces during PCB operations.

Conventional techniques utilize predictions and/or surface temperature measurements along the exposed surface of the PCB in an effort to determine temperature fluctuations (e.g., hot spots) during PCB operations. In one technique, a combined thermal and power simulation (utilizing software) is performed with a PCB design to simulate heat up of the PCB due to only current flow in copper traces, which is in turn used to obtain surface temperatures and hotspots with higher temperatures. Such simulated information is used to model heat sink, fan and power dissipation for the PCB components. In another technique, a power simulation (utilizing software) is also performed with a PCB design to obtain a power map for each layer of the PCB, which is then used to provide a thermal simulation along the layers, thus providing a prediction of temperatures along the PCB surface and inner layers during PCB operations. However, such conventional techniques are limited in that an inner temperature profile for the PCB can only be predicted (i.e., no actual temperature measurements are made internally within the PCB). For high speed traces, such as those used with SerDes structures, highly accurate temperature profiles within and along layers of the PCB are critical in order to accurately determine and budget for insertion losses along the traces during PCB operations (particularly since every inch along the PCB design matters). Having an accurate indication (i.e., through accurate measurements) of moisture/humidity levels at varying depths/layers of the PCB is also critical in accurately determining and budgeting for insertion losses associated with a particular PCB design.

In example embodiments, an analyzer and corresponding methods are described herein to obtain accurate measurements along and within (i.e., at varying depths/layers within) a PCB that correlate are used to determine temperature as well as moisture/humidity variations along and within the PCB. Such measurements also provide highly accurate indications of electrical properties of components (e.g., insertion losses along SerDes and/or other transmission line traces) of the PCB so as to facilitate optimization of PCB design and performance. In addition, PCBs are provided with temperature and/or moisture measuring sensor structures arranged along and/or within the PCB, where such sensor structures provide measurements that correlate with highly accurate temperature and/or relative humidity (RH) values at different depths within and at different locations along the PCB.

Figure 2A:
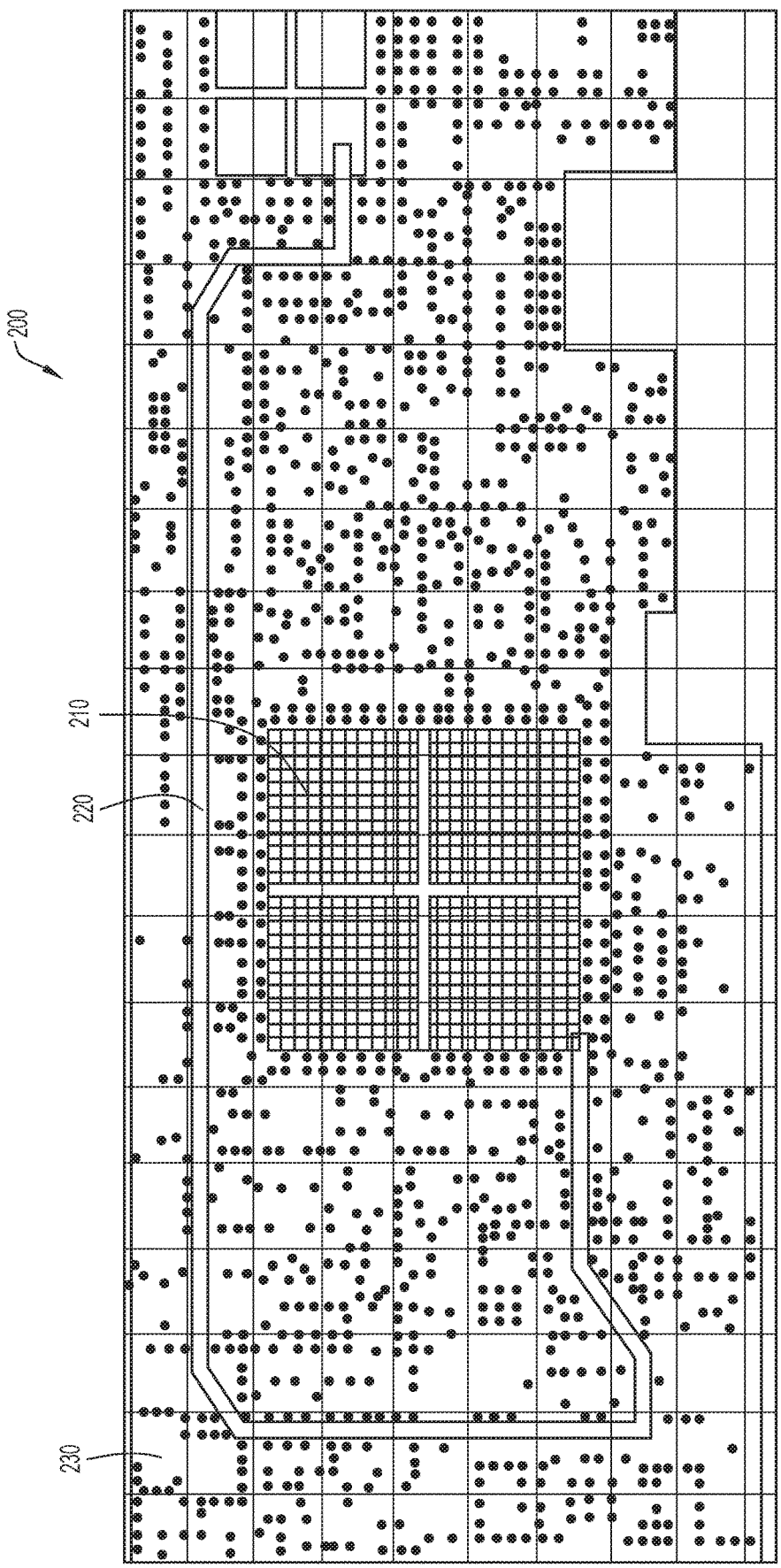
FIG. 2A depicts a top view in plan of an example embodiment of a PCB that facilitates accurate determinations of temperature and relative humidity at varying locations along and within the PCB, according to an example embodiment.

Referring to FIG. 2A, an example embodiment (top view in plan) of a PCB 200 is depicted having different layers with integrated circuits and other electrical components disposed at an exterior layer of the PCB as well as embedded at one or more different layers and depths within the PCB, such as integrated circuit component 210 (e.g., ASIC structure). One or more traces, e.g., trace 220, are provided along and/or within (e.g., at different depths/layers of) the PCB to facilitate transfer of electrical signals at varying frequencies between electrical components (e.g., transfer of signals between a SerDes structure and an ASIC structure) of the PCB.

Figure 2B:
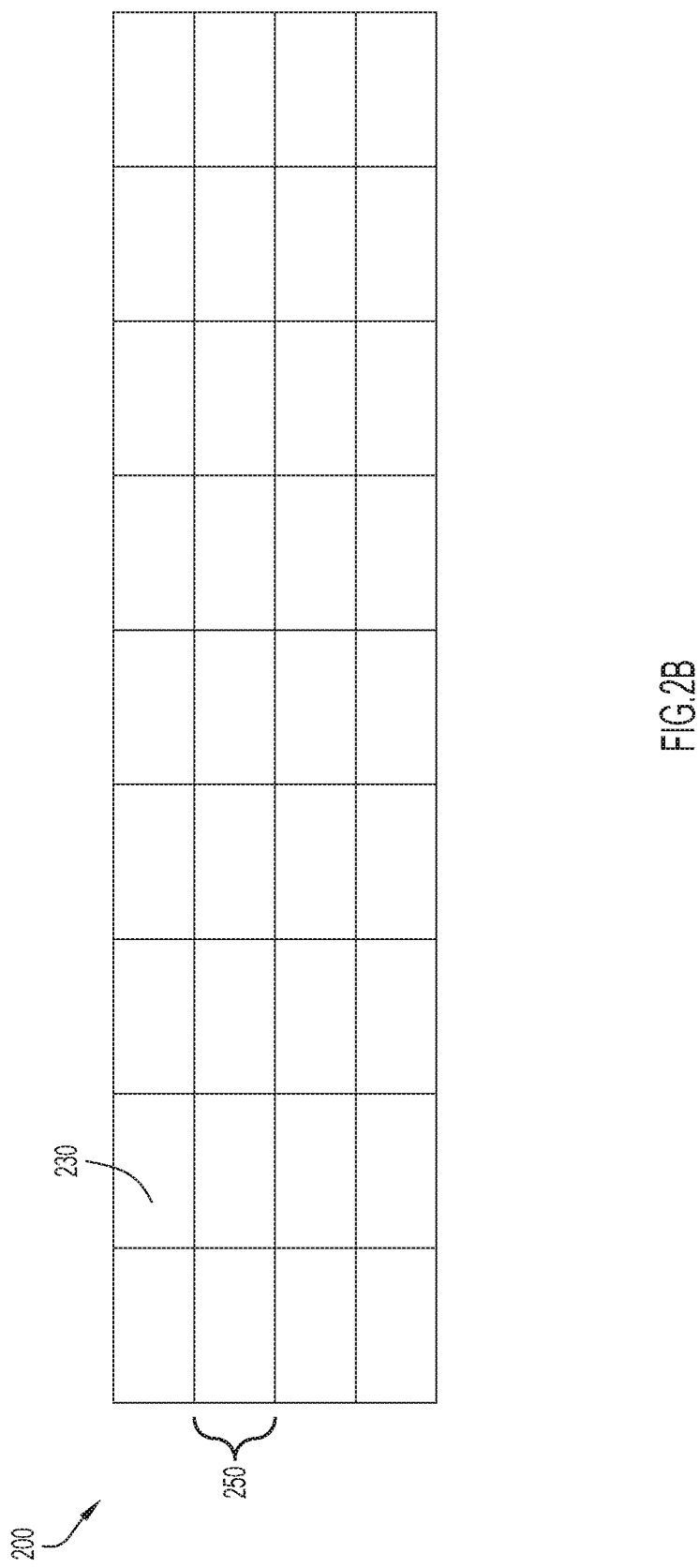
FIG. 2B depicts a side view of a portion of the PCB of FIG. 2A, showing different layers and PCB segments at varying depths of the PCB, according to an example embodiment.

A series of segments 230 can be defined for the PCB based upon a grid or array of intersecting lines along the PCB 200, where the grid segments are defined in the PCB map design or blue print (i.e., the segment grid lines are not actually formed within the actual PCB but instead design blue print lines to provide clear demarcations of areas along the PCB exterior surface as well as three dimensionally along layers within the PCB). The segments 230 can be defined three dimensionally (e.g., along the length, width and depth) of the PCB. The segments 230 can be defined along a depth of the PCB based upon a number of layers 250 of the PCB (e.g., a two dimensional grid of segments is defined along each vertically stacked layer of the PCB as shown, e.g., in FIG. 2B). Any suitable conventional or other techniques can be utilized to build up layers and form structures at the varying layers of the PCB based upon the PCB blue print or map design.

Any suitable number of measurement sensor structures are provided within segments 230 of the PCB 200. The measurement sensor structures can be provided at different locations along the top surface of the PCB 200 as well as at different layers within the PCB 200. The measurement sensor structures include temperature measurement sensors and moisture measurement sensors, where the sensor structures are provided at segment locations that are at or near trace locations (e.g., near different locations along trace 220) and/or any other selected integrated circuit components where it is desirable to obtain accurate and precise temperature or relative humidity determinations during PCB operations. For example, one or more temperature measurement sensors and/or one or more moisture measurement sensors can be provided at each defined segment 230 of the PCB. Alternatively, such sensor structures can be provided at any selected number of PCB segments 230 where it is desired to obtain precise measured temperature and moisture information (e.g., to obtain a precise temperature or relative humidity profile three dimensionally throughout the PCB).

An example embodiment of a temperature measurement sensor that can be placed at any location (e.g., within any segment 230 defined at a length, width and depth location) of the PCB 200 comprises a resistance measuring structure that is capable of measuring a resistance value for the structure at the segment location where it is provided and provide such measured data to an analyzer during PCB operations. However, any other suitable temperature measurement sensor which provides an accurate indication of temperature at the PCB segment of interest can also be formed within the PCB and used to provide measurements to the analyzer.

Resistance values of electrical conductors change with changing temperatures based upon the following correlation:

$$R=R_{ref}[1+\alpha(T-T_{ref})]; \text{ where:}$$

R=Conductor resistance at temperature T
$R_{ref}$=Conductor resistance at reference temperature
α=Temperature coefficient of resistance for the conductor material
$T_{ref}$=Reference temperature that a is specified at for the conductor material This correlation allows for a measurement of resistance of the conductor material, e.g., a copper conductor trace, based upon a measured voltage difference across the conductor material for the same applied current at any given time. This measured resistance is correlated with a temperature value at the precise location of the measured resistance $R_2$ (e.g., utilizing the equation set forth herein). In an example embodiment, a temperature measurement sensor that measures change in resistance can be formed at any PCB segment 230 along the upper surface of the PCB 200. A temperature measurement sensor can also be formed at any PCB segment 230 and at any layer within the PCB 200 as a copper trace that extends to the layer between two traces defined along vertically extending vias as shown, e.g., in FIG. 3. In particular, the PCB 200 includes N layers 250, with a resistance sensor 300 including a copper conductor trace 310 disposed at a layer and near an integrated circuit structure (e.g., a portion of a SerDes trace). A pair of vertical traces 320 of the resistance sensor 300 extend through vias of the PCB to the layer 250 of the PCB 200 at which trace 310 is located, where the vertical traces 320 are also in electrical contact with trace 310. The traces 320 extend to a suitable component (e.g., a FPGA) so as to facilitate selective application of a voltage across the temperature measurement sensor during PCB operations. The design of each trace 310, 320 is further configured (e.g., with suitable dimensions, materials of construction, etc., where trace 310 has greater dimension(s) in comparison to the dimensions of traces 320) such that the resistance $R_2$ of trace 310 is much greater than the resistances $R_1$ and $R_3$ of the vertical traces 320 (which serve as feeding points for generating a voltage difference across trace 310), e.g., $R_2 > R_1 + R_3$. This allows for an accurate measurement of the resistance value $R_2$ of trace 310. At any given time during operation of the PCB 200, a resistance value $R_2$ at trace 310 can be determined (e.g., via operation of an FPGA that is controlled by the analyzer and/or other components of the PCB).

Actual inner and outer layer moisture data can be determined based upon measured changes in capacitance across a moisture measurement sensor that is configured as a capacitance sensor. This is based upon the known properties of capacitance structures, where the dielectric properties of a material forming the capacitance structure, such as dielectric constant (Dk) and dielectric dissipation factor (Df), change with change in moisture absorption within the material. Similar to the temperature measure sensors, moisture measurement sensors can be provided at any suitable segment locations and at any depth/layer locations within the PCB 200 (e.g., in close proximity to the segment locations of the temperature measurement sensors).

A general configuration for a moisture measurement sensor in the form of a capacitance sensor includes a pair of conductor plates disposed formed at a PCB segment at or near the exterior surface of the PCB or at a desired layer of interest (where drop down conductor lines can also be provided to the level at which the sensor is located in a manner similar to that described for the resistance sensor that facilitate application of an electric field between the plates to determine a capacitance value). A suitable component (e.g., a FPGA) is provided to facilitate selective application of an electric field across the moisture measurement sensor and measurement of Dk and/or Df during PCB operations. At any given time during operation of the PCB 200, one or more capacitance values at the moisture measurement sensor can be determined (e.g., via operation of the FPGA that is controlled by the analyzer and/or other components of the PCB). Such one or more measured capacitance values can be correlated by the analyzer with a relative humidity value (for the inner layer and/or at the layer surface) at the segment location of the moisture measurement sensor. Thus, each capacitance sensor measures one or more capacitance values that correlates with a relative humidity value at the location of the capacitance sensor.

Example embodiments of capacitance sensors used to measure a moisture/relative humidity level at a particular layer of the PCB are described with reference to FIGS. 4A-4C and in relation to conductive transmission line traces (micro strip traces) disposed along the upper or exterior surface of the PCB and conductive transmission line traces (strip line traces) disposed at a layer embedded within the PCB.

Figure 3:
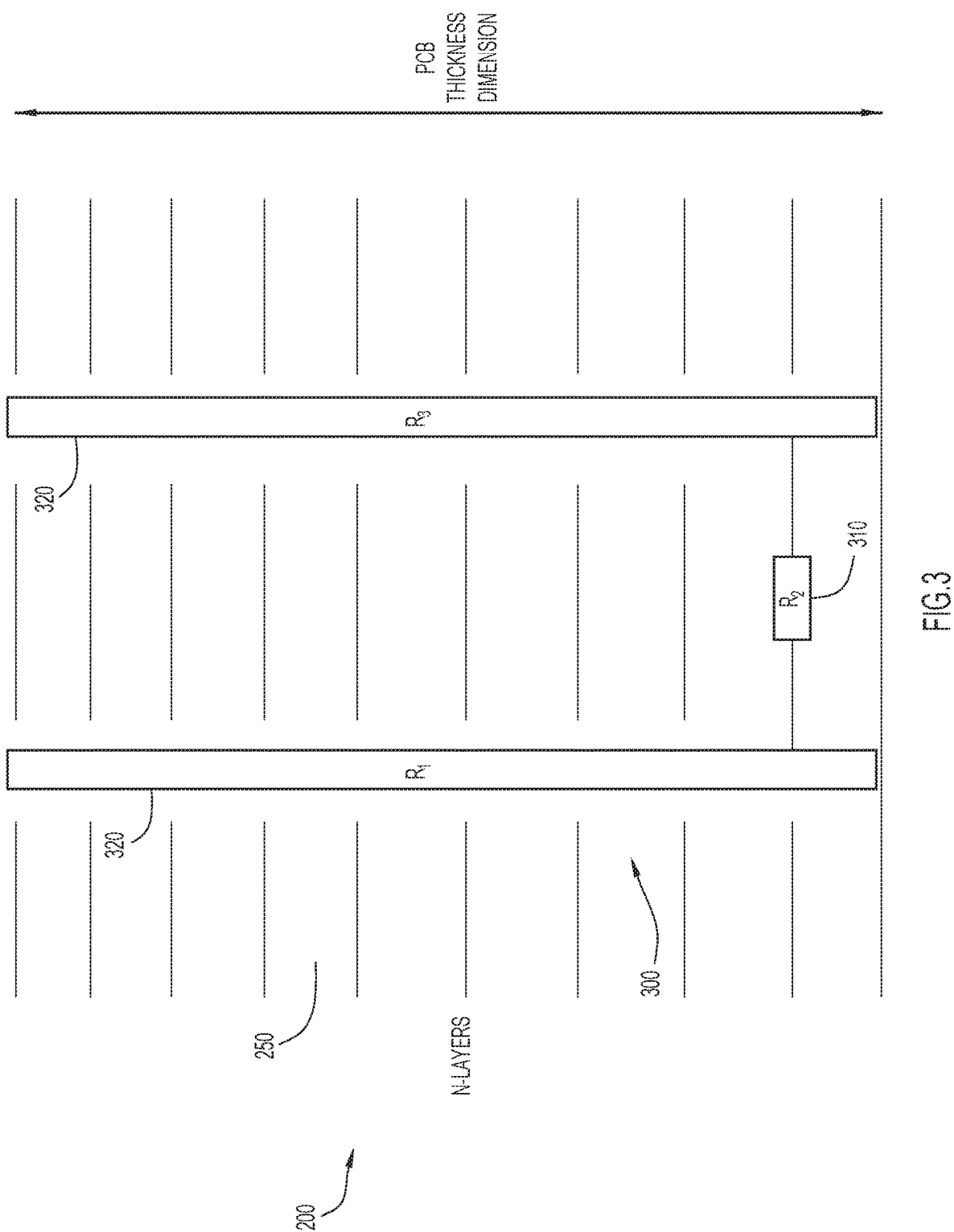
FIG. 3 depicts a temperature measurement sensor for implementation at an exterior surface of or at any depth/layer within the PCB of FIG. 2A, according to an example embodiment.
Figure 4A:
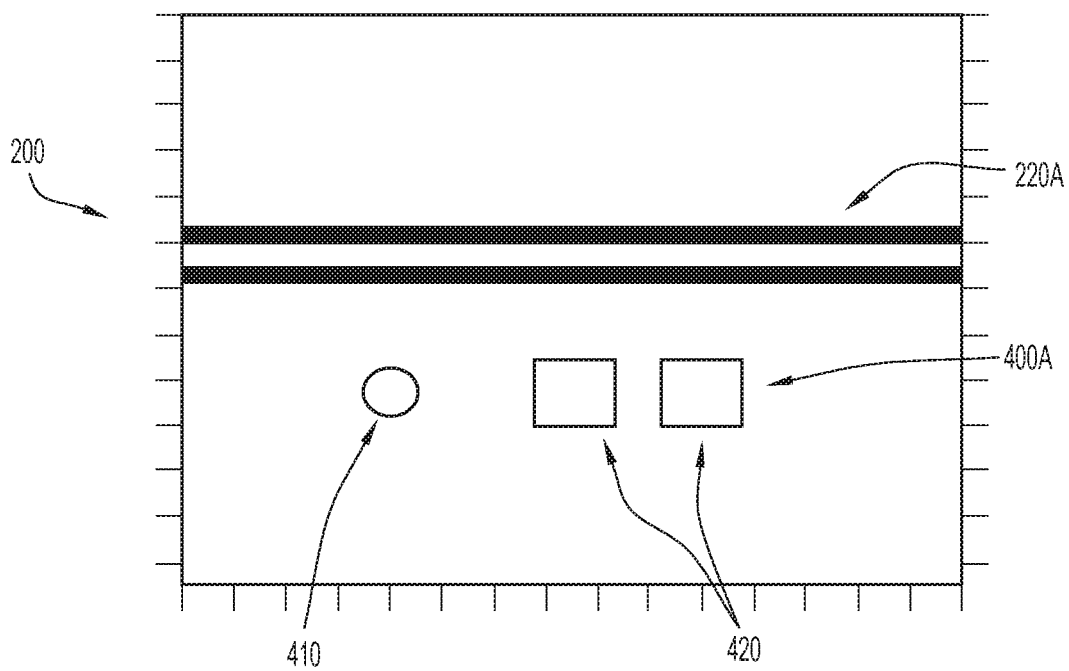
FIG. 4A depicts a top view in plan of a portion of a PCB including a temperature measurement sensor that measures temperature and a moisture measurement sensor that measures relative humidity at a transmission line trace provided along the exterior surface of the PCB (e.g., a micro strip trace), according to an example embodiment.
Figure 4B:
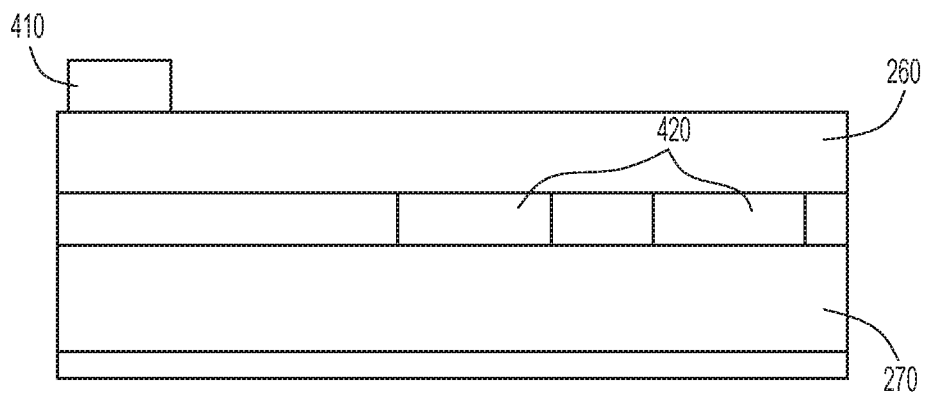
FIG. 4B depicts a cross sectional view of the portion of the PCB with moisture measurement sensor depicted in FIG. 4A, according to an example embodiment.

FIGS. 4A and 4B respectively show a top/exterior surface view and a cross-sectional view of a portion of the PCB 200 including micro strip traces 220A (i.e., traces formed on the exterior surface of the PCB) as well as a capacitance structure 400A that measures moisture and a resistive structure 410 formed on the surface (where the resistive structure 410 functions as a temperature sensor in the same manner as described herein for an embedded resistive structure 300 as depicted in FIG. 3). The capacitance structure 400A includes a pair of conductive (e.g., copper) plates 420 formed near the micro strip traces between a solder mask layer 260 and a dielectric layer 270. In this embodiment, a capacitance measurement C1 taken from a plate 420 to ground (GND) will correlate with an amount of moisture or relative humidity level at the dielectric layer 270 between GND and the top/solder mask layer 260. A second capacitance measurement C2 taken between the two plates 420 will correlate with an amount of moisture or relative humidity level in the solder mask layer 260. From both of these two measured capacitance values C1, C2, a relative humidity value is obtained for the micro strip traces 220A at the PCB segment location 230 in which the capacitance structure is located.

Figure 4C:
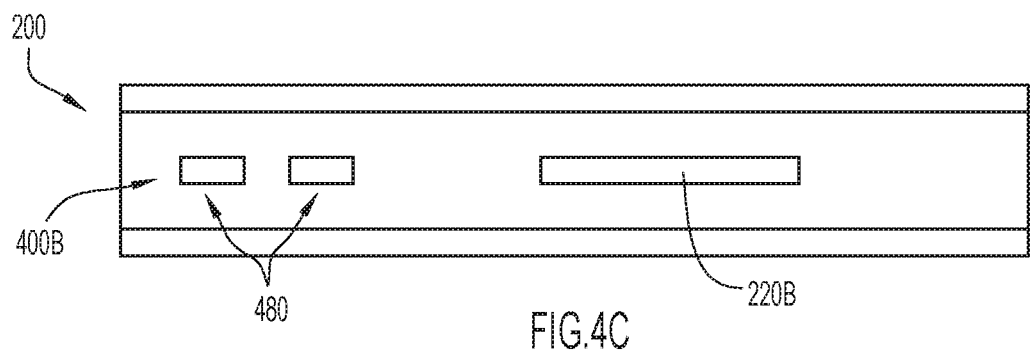
FIG. 4C depicts a cross sectional view of a portion of a PCB including a moisture measurement sensor that measures relative humidity at a transmission line trace provided at a layer within the PCB (e.g., a strip line trace), according to an example embodiment.

Another capacitance structure is depicted in FIG. 4C, which shows a cross-sectional view of an interior portion of PCB 200 at a level/layer that includes a strip line trace 220B (i.e., a conductive transmission line trace embedded within a dielectric material at an inner layer of the PCB) and a capacitance structure 400B including two conductive (e.g., copper) plates 480 provided at the same level as the strip line trace. Capacitance values C1 (taken between a conductive plate 480 and GND) and C2 (taken between the two plates 480) can be measured to provide a relative humidity value for the strip line trace 220B at the PCB segment location 230 in which the capacitance structure 400B is located.

An analyzer is provided to perform methods as described herein by determining insertion losses at traces (e.g., along trace 220) of the PCB 200 as well as any other electrical properties of other PCB components based upon varying temperatures and/or varying moistures at the PCB exterior surface as well as at varying layers (i.e., within varying depths) of the PCB during PCB operations. The analyzer can comprise a computing system that is separate from the PCB 200. Alternatively, the analyzer can include one or more components that are integrated with the PCB 200.

Figure 5:
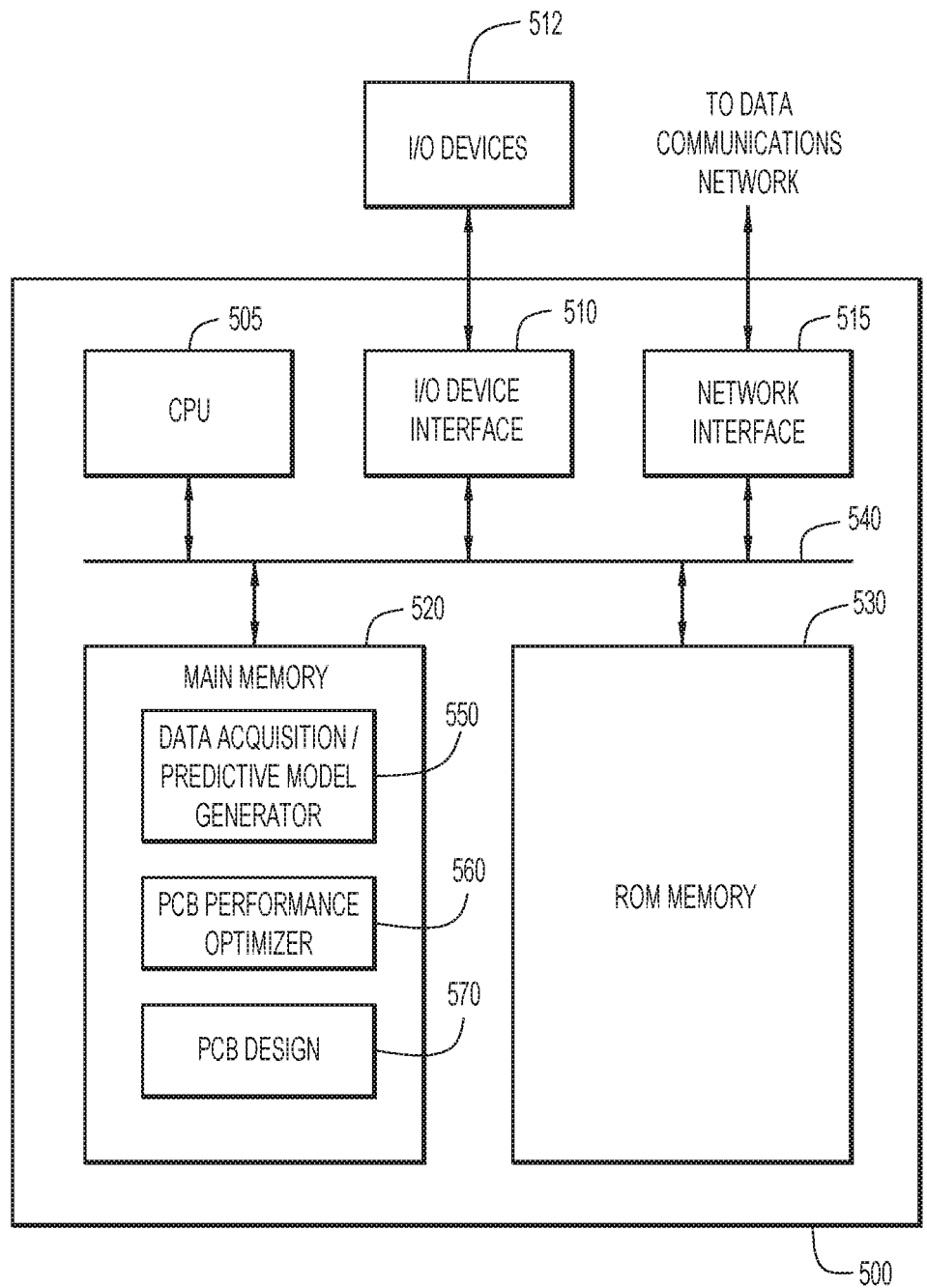
FIG. 5 depicts a schematic block diagram of an example embodiment of an analyzer that performs facilitates optimization of design and operations of a PCB utilizing the methods as described herein.

An example embodiment of an analyzer is depicted in the block diagram of FIG. 5. Referring to FIG. 5, analyzer 500 comprises a computing system that includes a central processing unit (CPU) 505, a network interface 515, a main memory 520, and a read only memory (ROM) 530, each connected to a bus 540. The computing system can also include an I/O device interface 510 connecting I/O devices 512 (e.g., keyboard, display, mouse devices, etc.) to the computing system. While FIG. 5 shows a single block for a processor/CPU 505, it should be understood that any number of processors can be provided representing a plurality of processing cores, each of which can perform separate processing.

The main memory 520 can include a random access memory (RAM) or other dynamic storage device (e.g., dynamic RAM (DRAM), static RAM (SRAM), and synchronous DRAM (SD RAM)), coupled to the bus 540 for storing information and instructions to be executed by CPU 505. In addition, the main memory 520 may be used for storing temporary variables or other intermediate information during the execution of instructions by the CPU 505. The main memory 520 can also be used for storing one or more software modules (e.g., modules 550, 560, and 570 as described herein) which include one or more software applications associated with performing operations of optimizing the design and performance of the PCB 200 as described herein. The analyzer 500 further includes a read only memory (ROM) 530 or other static storage device (e.g., programmable ROM (PROM), erasable PROM (EPROM), and electrically erasable PROM (EEPROM)) coupled to the bus 540 for storing static information and instructions for the CPU 505. While the depiction in FIG. 5 of the analyzer main memory 520 includes a Data Acquisition/Predictive Model Generator module 550, a PCB Performance Optimizer Module 560, and a PCB Design Module 570, it is noted that the one or more software applications associated with each of these modules can, alternatively, be arranged as a single module or any number of modules while still performing the methods of the analyzer as described herein.

While not specifically shown in FIG. 5, the analyzer 500 can further include other components including, without limitation, a disk controller coupled to the bus 540 to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the analyzer 500 using an appropriate device interface (e.g., small computer system interface (SCSI), integrated device electronics (IDE), enhanced-IDE (E-IDE), direct memory access (DMA), or ultra-DMA). The analyzer 500 can also include special purpose logic devices (e.g., ASIC structures) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, comprise types of processing circuitry. The processing circuitry may be located in one device or distributed across multiple devices.

The analyzer 500 performs a portion or all of the processing steps of the processes for optimizing design and performance of the PCB 200 in response to the CPU 505 executing one or more sequences of one or more instructions contained in a memory, such as the main memory 520 (e.g., using the one or more software programs of modules 550, 560, and 570). Such instructions can also be read into the main memory 520 from another computer readable medium, such as a hard disk or a removable media drive. One or more processors in a multi-processing arrangement may also be employed to execute the sequences of instructions contained in main memory 520. In alternative embodiments, hard-wired circuitry may be used in place of or in combination with software instructions. Thus, embodiments of the analyzer 500 are not limited to any specific combination of hardware circuitry and software.

As stated above, the analyzer 500 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the analyzer 500, for driving a device or devices for implementing the process, and for enabling the analyzer 500 to interact with a human user. Such software may include, but is not limited to, device drivers, operating systems, development tools, and applications software. Such computer readable storage media further includes a computer program product for performing all or a portion (if processing is distributed) of the processing presented herein. The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The network interface 515 of the analyzer 500 is also coupled to the bus 540 and provides a two-way data communication coupling to a network link that is connected to a data communications network (e.g., a local area network (LAN) and/or to one or more other networks, such as via the Internet). For example, the network interface 515 may be a wired or wireless network interface card to attach to any packet switched (wired or wireless) LAN. As another example, the network interface 515 may be an asymmetrical digital subscriber line (ADSL) card, an integrated services digital network (ISDN) card or a modem to provide a data communication connection to a corresponding type of communications line. Wireless links may also be implemented. In any such implementation, the network interface 515 sends and receives electrical, electromagnetic or optical signals that carry digital data streams representing various types of information. The network interface 515 typically provides data communication through one or more networks to other data devices (e.g., may provide a connection to another computer through a LAN or through equipment operated by a service provider, which provides communication services through one or more communications networks). The network interface 515 and the communications network(s) use, for example, electrical, electromagnetic, or optical signals that carry digital data streams, and the associated physical layer (e.g., CAT 5 cable, coaxial cable, optical fiber, etc.).

The analyzer 500 optimizes design and performance of components of a PCB by determining how electrical properties of one or more components vary during PCB operations based upon changes in temperature and relative humidity at different layers within the PCB. The temperature and moisture measurement sensors, which are located at specific PCB segments and are in close proximity to one or more components of interest (e.g., located within the same PCB segments are adjacent to PCB segments at which the components of interest are located), are used to determine a precise value for temperature and/or relative humidity at such locations, and such information is then correlated with an electrical property of the component located at such PCB segment.

In example embodiments, the analyzer 500 determines insertion losses along one or more conductive transmission line traces defined at one or more layers of the PCB (e.g., conductive traces that are near or within a specified distance from and/or associated or in electrical contact with a SerDes structure of the PCB). Utilizing the analyzer 500, a predictive model can be obtained that determines insertion losses along any one or more conductive traces of the PCB 200 as a function of temperature and moisture as well as signal frequency for a signal applied to each trace.

Figure 6:
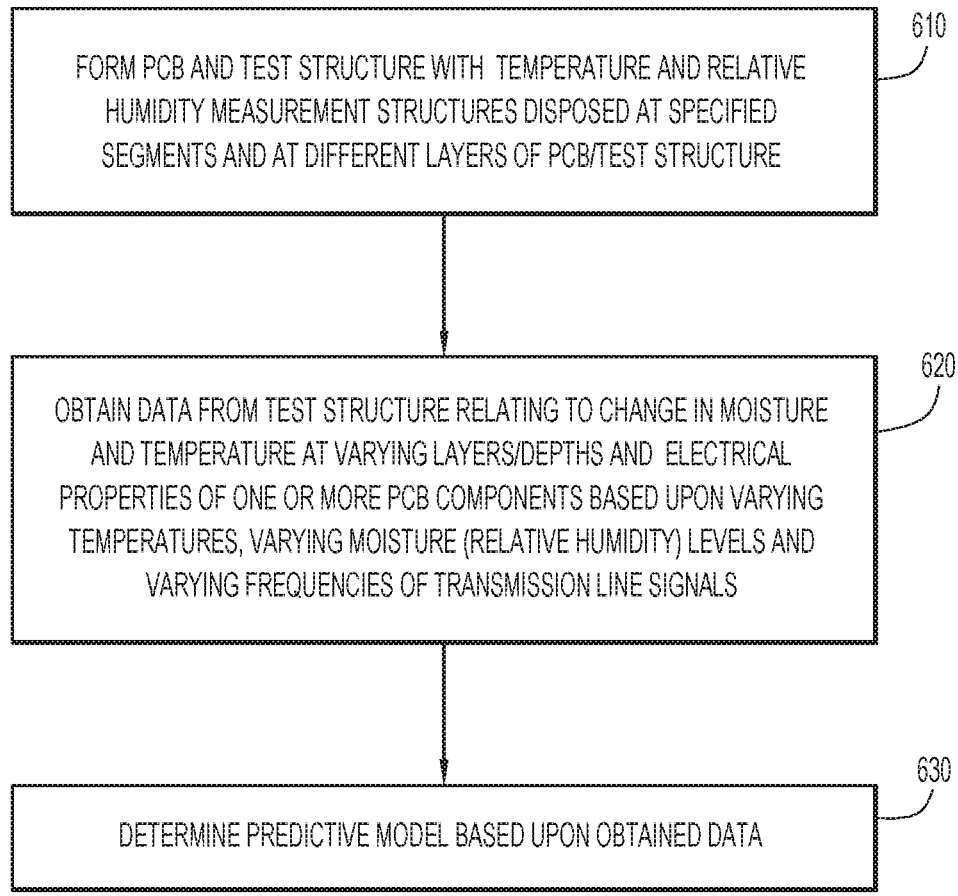
FIG. 6 depicts a flowchart describing an example method of generating a predictive model of an electrical property (e.g., insertion loss) for one or more components (e.g., one or more transmission line traces) based upon changes in temperature and relative humidity associated with the one or more components, according to an example embodiment.

A flowchart is depicted in FIG. 6 that provides an example embodiment for obtaining data used to develop a predictive model (e.g., utilizing Data Acquisition/Predictive Model Generator Module 550) to determine how insertion loss changes for a conductive trace formed at a certain location for a specific PCB architecture (e.g., the trace is defined at one or more specific PCB segments) based upon temperature changes, moisture changes and/or signal frequency changes.

Referring to FIG. 6, at 610, the PCB 200 is manufactured including N layers with components disposed on the surface of the PCB as well as at varying layers (i.e., at varying depths) within the PCB based upon a design architecture that enables the PCB to be used for a particular purpose or application. The design architecture for the PCB 200 defines a three dimensional map or grid of PCB segments 230 that also define locations of PCB components at or within such segments, and temperature measurement sensors (e.g., resistance sensors 300 as depicted in FIG. 3) and relative humidity measuring structures (e.g., capacitance structures 400A and/or 400B as depicted in FIGS. 4A-4C) are also formed at selected PCB segment locations and at varying depths/layers within the PCB based upon a desire or need to obtain temperature and moisture data at such locations during PCB operations. In essence, a three dimensional map or grid is defined throughout the PCB 200 that includes precise locations of temperature measurement sensors and moisture measurement sensors along with precise locations of the PCB components.

A model design test structure is also manufactured that has the same stack up (i.e., same number of layers) and also the same or similar cross-sectional configuration (at least with regard to PCB components of interest), including the same or similar conductive traces and/or other circuit components (i.e., test circuit components that correspond with PCB circuit components) located at the same segment depths as the manufactured PCB 200. The design test structure can be, e.g., a separate test PCB that closely resembles or models the configuration of PCB 200, or at least has the same or similar components at the same or similar locations (e.g., conductive traces having the same or similar dimensions and at the same depths/layers) as those of interest for the real PCB 200 that are to be monitored for electrical property changes due to temperature and/or moisture changes. Alternatively, the design test structure can be formed as a test coupon which is formed on the same wiring board as that on which the real PCB 200 is manufactured (e.g., the test coupon can be located at or near the perimeter or edge of the wiring board).

At 620, a series of tests are conducted by exposing the design test structure to varying temperatures and moisture/relative humidity levels within a controlled test chamber, and also at varying signal frequencies along one or more conductive traces of interest, where a range of varying temperatures, relative humidity values and signal frequencies to which the design test structure is exposed correspond with EDVT (electrical design validation/verification test) ranges for the PCB 200 based upon product specifications for a particular PCB design and application. One or more software modules are utilized by the analyzer 500 (e.g., Data Acquisition/Predictive Model Generator Module 550) to perform the series of tests so as to obtain data for dependence of temperatures, moisture/relative humidity values and component electrical properties (e.g., insertion losses along portions of one or more conductive traces) at selected locations on the surface and at different layers of the test structure based upon changes in ambient temperatures, relative humidity levels and changes in signal frequencies applied along traces for the test structure. Optionally, the analyzer 500 can control the test chamber to vary the temperature and/or humidity levels within the test chamber to which the test structure is exposed. The analyzer 500 can also control (e.g., via a FPGA) test signals sent to conductive transmission line traces of interest (e.g., transmission line traces associated with SerDes structures) as well as corresponding temperature and moisture measuring sensors (e.g., sensors located in close proximity to such conductive traces of interest) to obtain the measured temperature and relative humidity data at selected depths and throughout the thickness of the test structure. When utilizing sensor structures as depicted in FIGS. 3 and 4, the analyzer 500 obtains a resistance value at each resistance sensor 300 and one or more capacitance values at each capacitance structure 400A/400B being used in the test, and such resistance and capacitance values are correlated, respectively, with temperature and relative humidity values at the precise locations of such sensor structures (e.g., at varying depth and layer segment locations of the test structure).

Such data can be obtained at 610 by varying (within the test chamber) any one or more of the three variables of interest (ambient temperature within the test chamber, ambient relative humidity within the test chamber, and signal frequency for a signal applied across one or more conductive traces of interest) over the selected EDVT range. For example, the relative humidity within the test chamber can be set to a constant value, a frequency of a signal applied across a conductive trace can be set constant, and the temperature within the test chamber can then be varied over the EDVT range, with temperature and relative humidity being measured at the temperature and moisture measurement sensors provided at the varying layer locations within the test structure (and which correspond with such test structures provided within the PCB 200) along with measurements of signal loss along each conductive trace to which a signal is being applied. In a specific example, measured data with variance of the temperature variable (e.g., varying the temperature within the control chamber for a number of data points within the EDVT range) can be obtained as follows:

1. Start at ambient/room temperature (e.g., about 20-25° C.) for test structure within test chamber, setting/maintaining relative humidity for each conductive trace of interest at one or more selected fixed values.
2. Apply a signal at a set frequency across each conductive trace of interest, and measure and record temperature and humidity at locations proximate to the conductive traces of interest (i.e., at selected locations from selected temperature and moisture measurement sensors provided at different layers within the test structure that correspond with the locations of the traces) and insertion loss at each conductive trace of interest. The signal frequency can be modified or swept over a selected range for each conductive trace of interest utilizing a VNA (vector network analyzer), with corresponding temperature and humidity values also measured and recorded during the signal sweep.
3. Adjust temperature (e.g., increase or decrease temperature above or below ambient) within the test chamber to a value within the EDVT temperature range. This can occur by heating the test structure within the test chamber and/or performing operations with the test structure that causes the test structure to heat up. This also results in an adjustment of the temperature profile throughout the test structure and thus an adjustment in temperatures at different layers of the test structure.
4. Repeat steps 2 and 3 until suitable number of data points have been measured.
5. Adjust the relative humidity within the test chamber for each conductive trace of interest to other fixed values within the EDVT range for the PCB 200, and repeat steps 1-4.

The above steps can be further modified by performing operations for the test structure that simulate actual operations for the PCB 200 at the certain temperatures and/or moisture levels within the test chamber, with the application of signals at varying frequencies also being applied for certain conductive traces, to determine where hotspots might develop within the PCB 200 during actual operations (based upon temperature sensor measurements).

The measured data can be stored in any suitable format (e.g., tabular form) in the analyzer main memory 520. From this data, at 630, and depending upon the number of data points obtained, a precise predictive model can be generated using, e.g., any one or more conventional or other suitable type of curve fitting and/or regression machine learning algorithms (e.g., Bayesian and/or other suitable machine learning algorithms), that determines an electrical property value (e.g., insertion loss for each conductive transmission line trace of interest) based upon transmission signal frequency, and temperature and relative humidity that are local or proximate the component of interest (e.g., conductive trace located at specified PCB segment at a specific layer/depth within the PCB).

In an example scenario in which a predictive model is generated for a transmission line trace embedded at a layer within a PCB, a predictive model can be generated that provides an accurate prediction (at any given time during operation of the PCB) of insertion loss based upon a measured temperature and/or measured relative humidity as provided by one or more temperature measurement sensors and/or one or more moisture measurement sensors located at the same PCB segment and/or at adjacent PCB segment(s) as at least a portion of the transmission line trace. The data points obtained by the test structure can be used to determine a dependency of insertion loss for the trace of the PCB based upon any combination of these variables using, e.g., any conventional or other best fitting curve and/or regression techniques (i.e., determining a mathematical function that best fits a plot of the data points, which accurately serves as the predictive model for the transmission line trace of the PCB).

With the predictive model obtained using the methods described herein and depicted in the flowchart of FIG. 6, operation of a PCB 200 can be optimized by monitoring one or more electrical properties of one or more components of the PCB to determine whether the components are maintained within tolerance and specification for the PCB based upon a particular application and known hot spots within the PCB design that may occur when certain operational conditions are met. For example, in certain embodiments involving SerDes operations of the PCB, there is a need to minimize insertion losses for transmission line traces associated with the SerDes operations within certain tolerances in order to ensure efficient performance of the PCB. Insertion losses are hard to determine in real time during real PCB operations. The predictive model developed according to techniques described herein facilitates an accurate determination of what the insertion loss will be based upon the measured temperature and measured relative humidity for a signal trace at a given signal frequency of the transmission signal. Such information can be used to adjust operating parameters or conditions of the PCB to keep the PCB operating as closely as possible within design specifications and tolerances.

Figure 7:
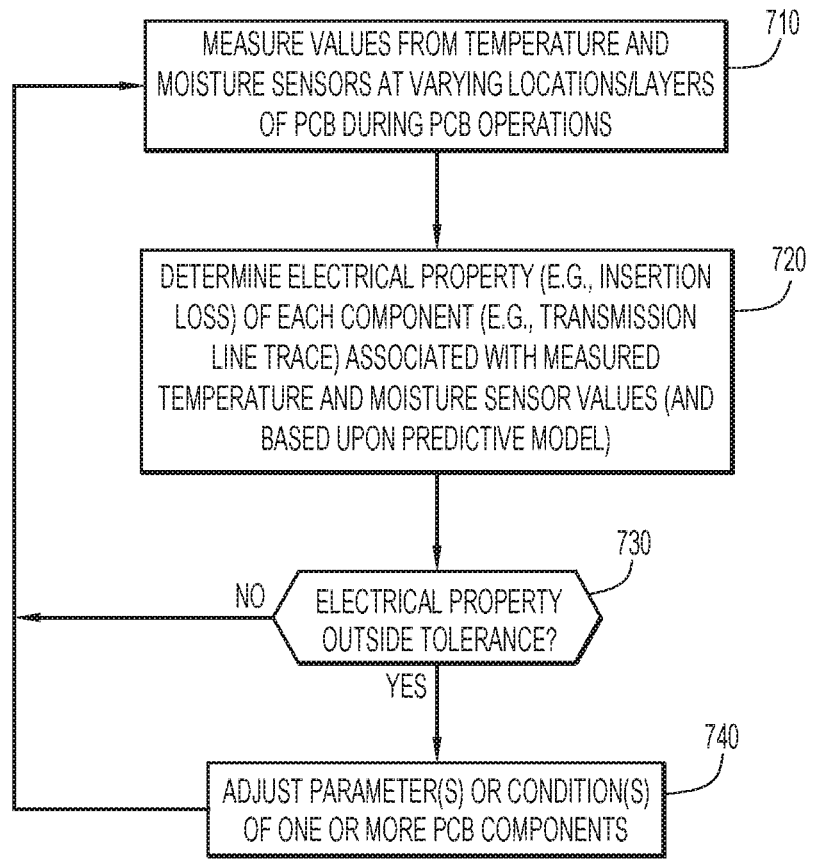
FIG. 7 depicts a flowchart describing an example method of optimizing performance of one or more components of a PCB during PCB operations, according to an example embodiment.

An example embodiment of a method for optimizing performance of a PCB (e.g., PCB 200) during operation of the PCB is depicted in the flowchart of FIG. 7. At any selected time during a PCB operation, at 710, the analyzer 500 (utilizing the PCB Performance Optimizer Module 560) measures values from one or more temperature measurement sensors and/or one or more moisture measurement sensors at different locations and at different depths/layers of the PCB, where the sensors correspond and are in close proximity (e.g., within the same PCB segment) with components of interest. For example, a SerDes trace (e.g., trace 220 disposed on the surface of PCB 200, or any other trace located at another layer within the PCB 200) may be a component of interest to be monitored for insertion losses that may occur during PCB operations. During step 710, any one or more temperature measurement sensors (e.g., a resistance sensor 300 that measures a resistance) that are proximate in location (e.g., in the same PCB segment or an adjacent PCB segment) as a portion of the SerDes trace and/or any one or more moisture measurement sensors (e.g., a capacitance structure 400A, 400B that measures one or more capacitance values) that are also proximate in location (e.g., in the same PCB segment or an adjacent PCB segment) as the portion of the SerDes trace are selected by the analyzer 500 to obtain measurements that correlate with temperature and/or relative humidity at such local or proximate location. Temperature and/or moisture measurements can be acquired by the analyzer 500 via the array of sensors provided along and within (at varying depths/layers) the PCB which are proximate in location (e.g., same or adjacent PCB segment location) as each PCB component of interest.

At 720, the electrical property for each component of interest is determined by the analyzer 500 based upon the measured temperature and/or moisture data obtained from step 710 and also based upon a predictive model that has previously been determined for the PCB design (e.g., via testing conducted in the process flowchart of FIG. 6). In the example of a SerDes trace being the PCB component of interest, an accurate prediction is made with the prediction model of the insertion loss for the trace at the PCB segment location where temperature and/or moisture data was measured and based upon the signal frequency associated with this SerDes trace. In a scenario in which the SerDes trace is embedded within (i.e., not provided along the exterior surface of) the PCB, the measured temperature and/or moisture data by the sensors located at the same depth and layer as (and further in the same or adjacent segment location as a portion of) the SerDes trace results in a very accurate prediction of the actual insertion loss for the SerDes trace. The same holds true for any other PCB component that may be embedded along a layer within the PCB and has an electrical property that changes based upon changing temperature and/or changing moisture conditions at such embedded location within the PCB.

At 730, it is determined whether the predicted electrical property for the PCB component (e.g., insertion loss for the SerDes trace) based upon at least the measured temperature and/or moisture conditions has changed so as to be outside a desired tolerance range (e.g., predicted insertion loss for the SerDes trace increases to a dB value that is outside of a tolerance range and that renders SerDes operations inefficient). In the event that the predicted electrical property is still within an acceptable tolerance range, the analyzer 500 can repeat the process at step 710 (assuming PCB operations associated with the PCB components of interest is still ongoing).

In the event that the predicted electrical property is unacceptable or outside of the desired tolerance range, at 740, one or more operating parameters or conditions of one or more PCB components is adjusted to optimize performance of PCB operations. For example, if a temperature in a local area in which the PCB component of interest is too warm (as determined by the temperature measurement sensor data obtained at one or more PCB segments), any number of corrective actions can be initiated (e.g., via instructions provided by the analyzer 500) by adjusting an operating parameter or condition of one or more PCB components, such as slowing down ASIC operations to reduce heat generation along and/or within the PCB, shutting down or deactivating components of the PCB to reduce heat generation, controlling fan speeds associated with the PCB for specified durations to cool the PCB down, etc. Other corrective actions may include slowing down operation of certain transmission line traces (e.g., reducing signal frequency), stalling or even taking such traces out of service for a certain time period to effect a cooling at one or more locations of the PCB.

After adjusting operating parameter(s) or condition(s) of PCB component(s), the process can be repeated starting at step 710 to determine the effect of such adjustments (i.e., by obtaining further temperature and/or moisture measurements at the specified PCB segment locations) so as to eventually bring PCB components of interest back to tolerance levels.

Thus, this process ensures optimal performance of the PCB with components of interest operating within acceptable tolerance levels (i.e., within suitable temperature and moisture levels that are deemed suitable for effective operation) or taken out of service during PCB operations until such time as acceptable tolerance levels can be achieved. This is particularly useful for SerDes traces, where temperature fluctuations at or within the PCB during PCB operations can be critical to the performance of the traces (since, as previously noted herein with reference to FIG. 1, insertion loss per inch can increase significantly with increasing temperatures, particularly at higher data signal rates).

The analyzer 500, using the predictive model generated in the manner described herein, can further employ methods to optimize a PCB design based upon obtaining a three dimensional temperature and/or moisture level profile for a PCB when subjected to varying external/ambient temperature and relative humidity conditions (e.g., by providing controlled temperature/moisture conditions within a test chamber) and also subjecting the PCB design to various operating conditions to determine where hot spots may occur not only on the surface of the PCB design but also within (at varying depths or layers) of the PCB design.

Figure 8:
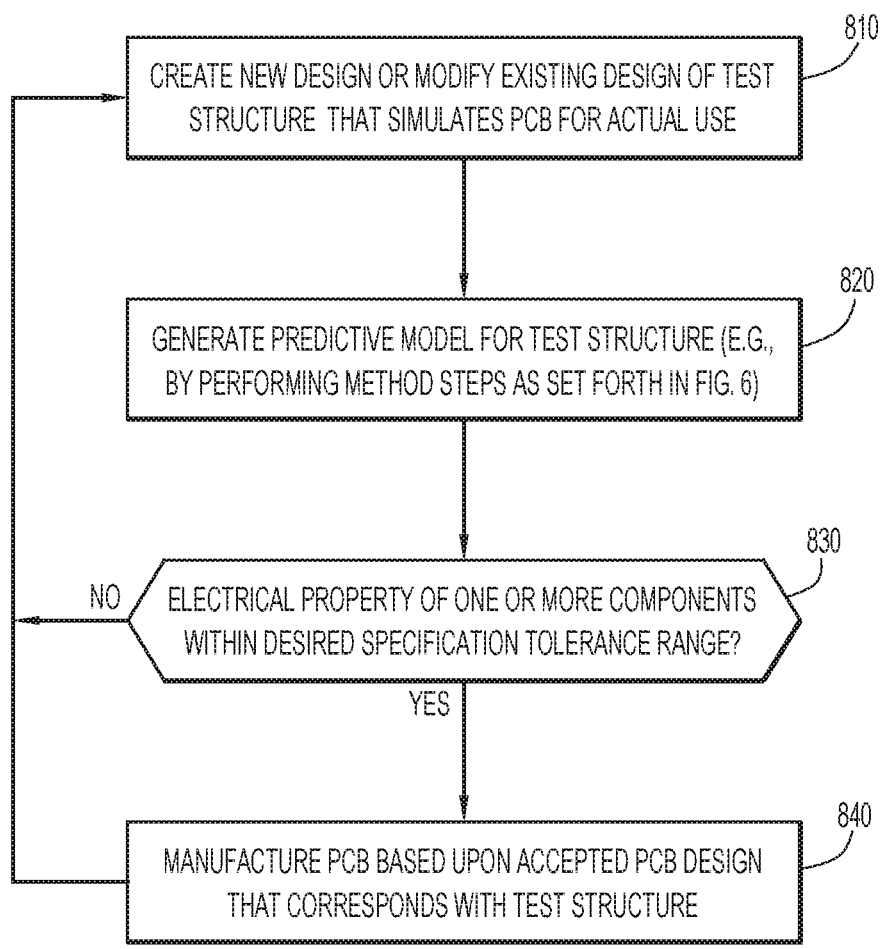
FIG. 8 depicts a flowchart describing an example method of optimizing a design of a PCB utilizing a predictive model as generated, e.g., via the method depicted in FIG. 6, according to an example embodiment.

An example embodiment of a method utilized by the analyzer 500 (e.g., utilizing PCB Design Module 570) to optimize a PCB design is described with reference to the flowchart of FIG. 8. At 810, a test structure for a PCB is formed (e.g., as a test coupon) including a new design or based upon an existing design, which includes components of the same or similar types and at the same or similar locations within the depth/layers of the test structure that correspond with the layers of the PCB to be formed. For example, a test structure can include conductive transmission line traces having designated lengths that correspond with SerDes traces which perform SerDes operations in a PCB.

At 820, a predictive model is generated for the test structure for each component of interest, where the predictive model can be generated using the method described herein and depicted in the flowchart of FIG. 6 (i.e., subjecting the test structure to varying temperatures and relative humidity levels within a test chamber over EDVT ranges determined for the PCB design, and measuring temperatures and/or relative humidity levels at varying segment locations along the test structure surface as well as at varying depths/layers of the test structure along with measuring the electrical conditions of components of interest at the same or similar locations). The predictive model correlates a change in electrical property of the component of interest, e.g., when temperature/moisture conditions at or near the component (e.g., within layers of the test structure) change from initial or ambient temperature and selected relative humidity conditions (e.g., a temperature of about 20-25° C. and a relative humidity of no greater than about 50%) to different values (e.g., increased temperature and/or increased relative humidity levels). When the component of interest is a SerDes or other conductive transmission line trace, the predictive model correlates a change in insertion loss over a portion or the entire conductive trace based upon temperature and/or relative humidity changes that the trace is subjected to (e.g., localized temperature and/or moisture levels at a layer disposed within the test structure, as measured by sensors disposed proximate or in the same PCB segment as a portion of the conductive trace).

Based upon the predictive model obtained for each test structure component of interest, a determination is made, at 830, regarding whether the test structure component of interest is performing at an acceptable level based upon whether the electrical property of the component falls within a desired specification tolerance range when exposed to the tested temperature and/or moisture level ranges. For SerDes or other conductive transmission line traces, insertion losses can be analyzed over the temperature and moisture level ranges as well as at different signal frequencies to determine whether the particular design for the trace will perform at an acceptable level under EDVT conditions for the PCB design (and based upon a particular application). When the electrical properties of all components of interest perform within acceptable tolerance levels over the range of EDVT temperatures and/or moisture levels (as determined by the predictive model for each component of interest), the PCB design that corresponds with test structure is deemed acceptable and a real PCB is then manufactured, at 840, based upon the acceptable PCB design.

In the event one or more test structure components do not operate in a desirable manner (based upon the electrical property of a component that is determined, according to the predictive model, to not be within a tolerance range over the EDVT temperature and/or moisture level ranges), method steps 810-830 are repeated, starting with a modification to the PCB design and test structure. In particular, the design of one or more components of interest that do not comply or operate in a desirable manner over the EDVT temperature and/or moisture level ranges within the current PCB design can be modified in some manner and then re-tested to determine whether the design modification yields a better result. In the example of a SerDes or other conductive transmission line trace, if insertion losses for the trace are too great over the EDVT temperature and/or moisture level range, the trace can be modified (e.g., trace length adjusted, routing of trace on board adjusted, materials used to construct the trace, the board and/or layers of the board adjusted, etc.) and re-tested at varying signal frequencies to determine whether the adjustment/redesign yields better performance/reduced insertion losses for the trace.

The PCB design optimization methods as described herein are in particular important when considering how much insertion loss can be budgeted per channel length for a transmission line trace such as a SerDes trace. In conventional PCB designs, channel loss/de-rating estimates (based primarily on changing temperature estimates over the exterior surface of the PCB) can be significant (e.g., as much as 50% or even greater), depending upon the type of materials used to manufacture the board (e.g., FR4 materials), PCB topology, use conditions, etc. Knowledge of more precise temperature and/or moisture values at a trace of interest (in particular, a trace that is embedded at a layer within the PCB) during the PCB design will allow for greater "buy back" of anticipated channel loss particularly for conductive transmission line traces that are 20 inches or greater. As an example, for a 30 inch channel with a de-rating of 20%, the anticipated channel loss budget would be about 6 dB for the entire channel, and this would need to be accounted for in the PCB design. Utilizing the predictive model and PCB design methods as described herein would provide a more accurate indication of the total channel loss which may result in allowing for a lower budget (i.e., some of the channel loss budget can be "bought back"), and this information could be used for modifying the PCB design in a more cost and/or performance effective manner.

Thus, the methods and PCB designs and configurations herein facilitate optimizing a design for a PCB for a particular application as well as optimize performance of the PCB during its operations.

Example embodiments as described herein include a method comprising providing a printed circuit board (PCB) comprising a plurality of layers disposed at different depths of the PCB, circuit components disposed at different layers of the PCB, and a plurality of temperature measurement sensors located at one or more layers of the PCB, each temperature measurement sensor being associated with a corresponding circuit component, obtaining a measured temperature at an embedded temperature measurement sensor located at an embedded layer within the PCB, and correlating the measured temperature with an electrical property of an embedded circuit component located at the same embedded layer within the PCB as the embedded temperature measurement sensor.

The PCB can further comprise a plurality of moisture measurement sensors located at one or more layers of the PCB, each moisture measurement sensor being associated with a corresponding circuit component, where the method further comprises obtaining a measured relative humidity at an embedded moisture measurement sensor located at the same embedded layer as the embedded temperature measurement sensor, where the correlating further comprises correlating the measured temperature and the relative humidity with the electrical property of the embedded circuit component at the same embedded layer as the embedded temperature measurement sensor and the embedded moisture measurement sensor.

The temperature measurement sensors can comprise resistance sensors, where each resistance sensor provides a measured resistance value that correlates with a temperature value.

The moisture measurement sensors can comprise capacitance sensors, where each capacitance sensor provides one or more measured capacitance values that correlates with a relative humidity value.

The embedded circuit component can comprises a transmission line trace, and the electrical property can comprise an insertion loss for the transmission line trace.

The method can further comprise selectively adjusting an operating parameter of one or more circuit components of the PCB based upon the electrical property correlated with the measured temperature at the embedded temperature measurement sensor.

The method can further comprise providing a test structure comprising a plurality of test layers disposed at different depths of the test structure that correspond with the plurality of layers of the PCB, test circuit components disposed at different test layers of the test structure that correspond with locations of circuit components at the plurality of layers of the PCB, and a plurality of test temperature measurement sensors located at one or more test layers of the test structure, each test temperature measurement sensor being associated with a corresponding test circuit component, and generating a predictive model that predicts the electrical property of the embedded circuit component of the PCB based upon temperature and electrical property measurements conducted with the test structure.

The predictive model can be generated by: (a) adjusting a temperature of the test structure that causes temperature to change at an embedded layer within the test structure that corresponds with the embedded layer of the PCB at which the embedded circuit component is located; (b) obtaining a measured temperature at an embedded temperature measurement sensor located at the embedded layer within the test structure; (c) measuring an electrical property of an embedded test circuit component located at the embedded layer within the test structure and which corresponds with the embedded circuit component of the PCB; (d) repeating steps (a)-(c) a set number of times to collect measured temperature values and corresponding measured electrical property values; and (e) developing the predictive model that correlates the electrical property of the embedded circuit component of the PCB with measured temperature values measured at the embedded temperature measurement sensor located at the same embedded layer as the embedded circuit component.

The method can further comprise: (f) modifying an arrangement or a dimension of the embedded circuit component at the embedded layer for the PCB utilizing the predictive model.

Additional example embodiments as described herein comprise one or more computer readable storage media encoded with software comprising computer executable instructions and when the software is executed operable to: obtain a measured temperature at an embedded temperature measurement sensor located at an embedded layer within a printed circuit board (PCB), where the PCB comprises a plurality of layers disposed at different depths of the PCB, circuit components disposed at different layers of the PCB, and a plurality of temperature measurement sensors located at one or more layers of the PCB, each temperature measurement sensor being associated with a corresponding circuit component; and correlate the measured temperature with an electrical property of an embedded circuit component located at the same embedded layer within the PCB as the embedded temperature measurement sensor.

The PCB can further comprise a plurality of moisture measurement sensors located at one or more layers of the PCB, each moisture measurement sensor being associated with a corresponding circuit component, and the instructions can be further operable to: obtain a measured relative humidity at an embedded moisture measurement sensor located at the same embedded layer of the PCB as the embedded temperature measurement sensor, where the correlating further comprises correlating the measured temperature and the measured relative humidity with the electrical property of the embedded circuit component at the same embedded layer as the embedded temperature measurement sensor and the embedded moisture measurement sensor.

The temperature measurement sensors of the PCB can comprise resistance sensors, where each resistance sensor provides a measured resistance value, and the instructions can be further operable to correlate the measured resistance value with a temperature value.

The moisture measurement sensors of the PCB can comprise capacitance sensors, where each capacitance sensor provides one or more measured capacitance values, and the instructions can be further operable to correlate the one or more measured capacitance values with a relative humidity value.

The embedded circuit component of the PCB can comprise a transmission line trace, and the instructions can be further operable to correlate an insertion loss for the transmission line trace.

The instructions can be further operable to: generate a predictive model that predicts the electrical property of the embedded circuit component of the PCB based upon temperature and electrical property measurements conducted with a test structure, where the test structure comprises a plurality of test layers disposed at different depths of the test structure that correspond with the plurality of layers of the PCB, test circuit components disposed at different test layers of the test structure that correspond with locations of circuit components at the plurality of layers of the PCB, and a plurality of test temperature measurement sensors located at one or more test layers of the test structure, each test temperature measurement sensor being associated with a corresponding test circuit component.

The instructions can be further configured to generate the predictive model for the embedded circuit component of the PCB by: (a) controlling an adjustment of a temperature of the test structure that causes temperature to change at an embedded layer within the test structure that corresponds with the embedded layer of the PCB at which the embedded circuit component is located; (b) obtain a measurement of a temperature at an embedded temperature measurement sensor located at the embedded layer within the test structure; (c) obtain a measurement of an electrical property of an embedded test circuit component located at the embedded layer within the test structure and which corresponds with the embedded circuit component of the PCB; (d) repeat steps (a)-(c) a set number of times to collect and store measured temperature values and corresponding measured electrical property values; and (e) develop the predictive model that correlates the electrical property of the embedded circuit component of the PCB with temperature values measured at the embedded temperature measurement sensor located at the same embedded layer as the embedded circuit component.

Further example embodiments as described herein comprise a printed circuit board (PCB) comprising a plurality of layers disposed at different depths of the PC, a plurality of circuit components disposed at different layers of the PCB, and a plurality of temperature measurement sensors located at one or more layers of the PCB, each temperature measurement sensor being associated with a corresponding circuit component so as to measure a temperature for the corresponding circuit component during operation of the PCB. At least one temperature measurement sensor and the corresponding circuit component are located at an embedded layer within the PCB.

The PCB can further comprise a plurality of moisture measurement sensors located at one or more layers of the PCB, each moisture measurement sensor being associated with a corresponding circuit component so as to measure a relative humidity for the corresponding circuit component during operation of the PCB, where at least one moisture measurement and the corresponding circuit component are located at an embedded layer within the PCB.

The temperature measurement sensors of the PCB can comprise resistance sensors, where each resistance sensor measures a resistance that correlates with a temperature value. In addition, the moisture measurement sensors can comprise capacitance sensors, where each capacitance sensor measures one or more capacitance values that correlates with a relative humidity value.

The embedded circuit component of the PCB can comprise a transmission line trace.

The above description is intended by way of example only. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   providing a printed circuit board (PCB) comprising a plurality of layers disposed at different depths of the PCB, circuit components disposed at different layers of the PCB, and a plurality of temperature measurement sensors located at one or more layers of the PCB, each temperature measurement sensor being associated with a corresponding circuit component;
   obtaining a measured temperature at an embedded temperature measurement sensor located at an embedded layer within the PCB; and
   correlating the measured temperature with an electrical property of an embedded circuit component located at the same embedded layer within the PCB as the embedded temperature measurement sensor.

2. The method of claim 1, wherein the PCB further comprises a plurality of moisture measurement sensors located at one or more layers of the PCB, each moisture measurement sensor being associated with a corresponding circuit component, the method further comprising:
   obtaining a measured relative humidity at an embedded moisture measurement sensor located at the same embedded layer as the embedded temperature measurement sensor;
   wherein correlating further comprises correlating the measured temperature and the measured relative humidity with the electrical property of the embedded circuit component at the same embedded layer as the embedded temperature measurement sensor and the embedded moisture measurement sensor.

3. The method of claim 2, wherein the temperature measurement sensors comprise resistance sensors, and each resistance sensor provides a measured resistance value that correlates with a temperature value.

4. The method of claim 3, wherein the moisture measurement sensors comprise capacitance sensors, and each capacitance sensor provides one or more measured capacitance values that correlates with a relative humidity value.

5. The method of claim 1, the embedded circuit component comprises a transmission line trace, and the electrical property comprises an insertion loss for the transmission line trace.

6. The method of claim 1, further comprising:
   selectively adjusting an operating parameter of one or more circuit components of the PCB based upon the electrical property correlated with the measured temperature at the embedded temperature measurement sensor.

7. The method of claim 1, further comprising:
   providing a test structure comprising a plurality of test layers disposed at different depths of the test structure that correspond with the plurality of layers of the PCB, test circuit components disposed at different test layers of the test structure that correspond with locations of circuit components at the plurality of layers of the PCB, and a plurality of test temperature measurement sensors located at one or more test layers of the test structure, each test temperature measurement sensor being associated with a corresponding test circuit component; and
   generating a predictive model that predicts the electrical property of the embedded circuit component of the PCB based upon temperature and electrical property measurements conducted with the test structure.

8. The method of claim 7, wherein the predictive model is generated by:
   (a) adjusting a temperature of the test structure that causes temperature to change at an embedded layer within the test structure that corresponds with the embedded layer of the PCB at which the embedded circuit component is located;
   (b) obtaining a measured temperature at an embedded temperature measurement sensor located at the embedded layer within the test structure;
   (c) measuring an electrical property of an embedded test circuit component located at the embedded layer within the test structure and which corresponds with the embedded circuit component of the PCB;
   (d) repeating steps (a)-(c) a set number of times to collect measured temperature values and corresponding measured electrical property values; and
   (e) developing the predictive model that correlates the electrical property of the embedded circuit component of the PCB with measured temperature values at the embedded temperature measurement sensor located at the same embedded layer as the embedded circuit component.

9. The method of claim 8, further comprising:
   (f) modifying an arrangement or a dimension of the embedded circuit component at the embedded layer for the PCB utilizing the predictive model.

10. One or more computer readable storage media encoded with software comprising computer executable instructions and when the software is executed operable to:

obtain a measured temperature at an embedded temperature measurement sensor located at an embedded layer within a printed circuit board (PCB), wherein the PCB comprises a plurality of layers disposed at different depths of the PCB, circuit components disposed at different layers of the PCB, and a plurality of temperature measurement sensors located at one or more layers of the PCB, each temperature measurement sensor being associated with a corresponding circuit component; and correlate the measured temperature with an electrical property of an embedded circuit component located at the same embedded layer within the PCB as the embedded temperature measurement sensor.

11. The computer readable storage media of claim 10, wherein the PCB further comprises a plurality of moisture measurement sensors located at one or more layers of the PCB, each moisture measurement sensor being associated with a corresponding circuit component, and the instructions are further operable to:

obtain a measured relative humidity at an embedded moisture measurement sensor located at the same embedded layer of the PCB as the embedded temperature measurement sensor;

wherein the correlating further comprises correlating the measured temperature and the measured relative humidity with the electrical property of the embedded circuit component at the same embedded layer as the embedded temperature measurement sensor and the embedded moisture measurement sensor.

12. The computer readable storage media of claim 11, wherein the temperature measurement sensors of the PCB comprise resistance sensors, each resistance sensor provides a measured resistance value, and the instructions are further operable to correlate the measured resistance value with a temperature value.

13. The computer readable storage media of claim 12, wherein the moisture measurement sensors of the PCB comprise capacitance sensors, each capacitance sensor provides one or more measured capacitance values, and the instructions are further operable to correlate the one or more measured capacitance values with a relative humidity value.

14. The computer readable storage media of claim 10, wherein the embedded circuit component of the PCB comprises a transmission line trace, and the instructions are further operable to correlate an insertion loss for the transmission line trace.

15. The computer readable storage media of claim 10, wherein the instructions are further operable to:

generate a predictive model that predicts the electrical property of the embedded circuit component of the PCB based upon temperature and electrical property measurements conducted with a test structure, wherein the test structure comprises a plurality of test layers disposed at different depths of the test structure that correspond with the plurality of layers of the PCB, test circuit components disposed at different test layers of the test structure that correspond with locations of circuit components at the plurality of layers of the PCB, and a plurality of test temperature measurement sensors located at one or more test layers of the test structure, each test temperature measurement sensor being associated with a corresponding test circuit component.

16. The computer readable storage media of claim 15, wherein the instructions are further configured to generate the predictive model for the embedded circuit component of the PCB by:

(a) controlling an adjustment of a temperature of the test structure that causes temperature to change at an embedded layer within the test structure that corresponds with the embedded layer of the PCB at which the embedded circuit component is located;

(b) obtain a measurement of a temperature at an embedded temperature measurement sensor located at the embedded layer within the test structure;

(c) obtain a measurement of an electrical property of an embedded test circuit component located at the embedded layer within the test structure and which corresponds with the embedded circuit component of the PCB;

(d) repeat steps (a)-(c) a set number of times to collect and store measured temperature values and corresponding measured electrical property values; and (e) develop the predictive model that correlates the electrical property of the embedded circuit component of the PCB with temperature values measured at the embedded temperature measurement sensor located at the same embedded layer as the embedded circuit component.

17. A printed circuit board (PCB) comprising:

a plurality of layers disposed at different depths of the PC;

a plurality of circuit components disposed at different layers of the PCB; and a plurality of temperature measurement sensors located at one or more layers of the PCB, each temperature measurement sensor being associated with a corresponding circuit component so as to measure a temperature for the corresponding circuit component during operation of the PCB;

wherein at least one temperature measurement sensor and a corresponding embedded circuit component are located at an embedded layer within the PCB.

18. The PCB of claim 17, further comprising:

a plurality of moisture measurement sensors located at one or more layers of the PCB, each moisture measurement sensor being associated with a corresponding circuit component so as to measure a relative humidity for the corresponding circuit component during operation of the PCB;

wherein at least one moisture measurement and a corresponding embedded circuit component are located at an embedded layer within the PCB.

19. The PCB of claim 18, wherein:

the temperature measurement sensors comprise resistance sensors, and each resistance sensor measures a resistance that correlates with a temperature value; and the moisture measurement sensors comprise capacitance sensors, and each capacitance sensor measures one or more capacitance values that correlates with a relative humidity value.

20. The PCB of claim 17, wherein the embedded circuit component comprises a transmission line trace.

* * * * *